United States Patent [19]

Ito et al.

[11] Patent Number: 5,019,810
[45] Date of Patent: May 28, 1991

[54] APPARATUS FOR DETECTING MALFUNCTION OF INTERFACE CIRCUIT IN COMMUNICATION LINE BETWEEN CONTROLLERS IN A VEHICLE CONTROL SYSTEM

[75] Inventors: Yasunobu Ito; Kunihiro Yamada, both of Aichi, Japan

[73] Assignee: Aisin AW Kabushiki Kaisha, Japan

[21] Appl. No.: 508,465

[22] Filed: Apr. 13, 1990

Related U.S. Application Data

[63] Continuation of Ser. No. 268,755, Jan. 19, 1988, abandoned.

[30] Foreign Application Priority Data

Dec. 28, 1987 [JP] Japan ................. 62-329503

[51] Int. Cl.$^5$ .................. H04Q 9/00; G05B 23/02
[52] U.S. Cl. .................. 340/825.06; 340/653; 324/509; 364/424.1
[58] Field of Search .................. 74/844, 857; 324/509, 324/510, 549; 340/635, 653, 660, 664, 825.06; 364/424.03, 424.04, 424.1, 424.11, 424.12

[56] References Cited

U.S. PATENT DOCUMENTS

| | | | |
|---|---|---|---|
| 3,641,532 | 2/1972 | McAdams, Jr. | 340/653 |
| 3,665,303 | 5/1972 | Richards et al. | 340/653 |
| 3,863,208 | 1/1975 | Balban | 340/653 |
| 4,178,542 | 12/1979 | McCarthy | 340/653 |
| 4,354,182 | 10/1982 | Frey | 340/653 |
| 4,414,863 | 11/1983 | Heino | 364/424.1 |
| 4,635,508 | 1/1987 | Tatsumi | 364/424.1 |
| 4,695,941 | 9/1987 | Kumar | 364/431.11 |
| 4,764,729 | 8/1988 | Yakuwa et al. | 324/509 |
| 4,782,300 | 11/1988 | Bonaccio et al. | 324/509 |
| 4,843,557 | 6/1989 | Ina et al. | 364/431.11 |

FOREIGN PATENT DOCUMENTS

| | | | |
|---|---|---|---|
| 0052306 | 3/1984 | Japan | 364/424.03 |
| 1574104 | 9/1989 | United Kingdom . | |

OTHER PUBLICATIONS

"Microprocessor controls engine and transmission", 8/83, Automotive Engineering, pp. 42–45.

*Primary Examiner*—Donald J. Yusko
*Assistant Examiner*—Brian Zimmerman
*Attorney, Agent, or Firm*—Lorusso & Loud

[57] ABSTRACT

In a system for controlling a vehicle by exchanging signals between an electronic controller for controlling a vehicle transmission and another electronic controller for controlling a vehicle engine, the transmission controller incorporates a monitor circuit which receives, via an interface circuit of the engine controller, a signal output from the transmission controller through a communication circuit, and which is capable of detecting abnormalities of the interface circuit of the engine controller. If an abnormality of the interface circuit of the engine controller takes place such that the engine torque cannot be reduced although the transmission controller issues an instruction to reduce the engine torque, the transmission controller maintains the line pressure instead of reducing the same to cope with such a situation, thus effecting fail-safe control.

5 Claims, 4 Drawing Sheets

Fig. 4

| VA | VB | VC | VD |
|----|----|----|----|
| LA | LB | LC | HD |
| HA | HB | HC | LD |

Fig. 5

| VA | VB  | VC  | VD |
|----|-----|-----|----|
| LA | LB  | LC  | HD |
| HA | LB' | LC' | HD |

Fig. 6

| VA | VB  | VC  | VD |
|----|-----|-----|----|
| LA | HB' | HC' | LD |
| HA | HB' | HC' | LD |

APPARATUS FOR DETECTING MALFUNCTION OF INTERFACE CIRCUIT IN COMMUNICATION LINE BETWEEN CONTROLLERS IN A VEHICLE CONTROL SYSTEM

This application is a continuation of application Ser. No. 07/268,755, filed Nov. 9, 1988, now abandoned.

BACKGROUND OF THE INVENTION

This invention relates to an apparatus for detecting, at one end of a communication line, malfunctions of an interface circuit provided on the other end of the communication line. More particularly, this invention relates to an apparatus for detecting a malfunction of an interface circuit of an electronic controller for operating an engine of a vehicle in association with an electronic controller for controlling the transmission.

There have been made attempts to improve shifting performance of electronically controlled automatic transmissions in terms of smoothness and the like. To attain such an improvement, a type of control system is generally adopted in which a signal is supplied from a T/M (transmission) controller to an E/G (engine) controller, and the E/G controller reduces the engine torque on the basis of this signal while the T/M controller reduces the line pressure.

The construction of an example of this conventional control system will be described below in detail with reference to FIG. 1.

As schematically shown in FIG. 1, a CPU 2 of a T/M controller 1 outputs a signal via a communication circuit 3 in order to reduce a shift shock when the speed of the automatic transmission is changed, this signal is input into a CPU (central processing unit) 6 provided in an E/G controller 5 through an interface circuit 7 of the E/G controller 5, and an engine torque reduction signal $S_2$ is supplied from an output stage 8 of the E/G controller 5 to the engine 11. At the same time, the T/M controller 1 supplies a line pressure reduction signal $S_1$ to the transmission 10 via an output stage 4 in order to reduce the line pressure, thereby enabling a reduction in the shift shock by the cooperation of the E/G system and the T/M system, thus performing shift control.

However, a further improvement in the control of the cooperation of T/M and E/G systems is expected in order to maintain comfortableness for the occupant during running of the vehicle even in the event that the interface circuit 7 of the E/G controller 5 malfunctions due to, for example, a short circuit or disconnection of a pull-up resistor in the interface circuit caused by vibrations or the like during running (although wiring design and maintenance of the controller have been fully considered in order to avoid such a malfunction).

SUMMARY OF THE INVENTION

In consideration of these circumstances, it is an object of the present invention to provide an apparatus which is used to detect, at one end of a communication line, malfunctions of an interface circuit provided on the other end of the communication line and which enables a transmission of a vehicle to be smoothly controlled during shifting by optimizing the control of the cooperation of the T/M and E/G systems.

To attain this object, the present invention provides, in a system for controlling a vehicle by exchanging signals between an electronic controller for controlling a vehicle transmission and another electronic controller for controlling a vehicle engine, a monitor circuit which is incorporated in the T/M controller, which receives, via an interface circuit of the E/G controller, a signal output from the T/M controller through a communication circuit, and which is capable of detecting abnormalities of the interface circuit of the E/G controller.

Thus, in accordance with the present invention, the monitor circuit for monitoring an interface of the E/G controller is provided in the T/M controller, thereby enabling detection of abnormalities of the interface circuit of the E/G controller. If an abnormality of the interface circuit of E/G controller takes place such that the engine torque cannot be reduced although the T/M controller issues an instruction to reduce the engine torque for shifting, the T/M controller maintains the line pressure instead of reducing the same to cope with such a situation, thereby effecting fail-safe control.

Thus, the operations of the T/M controller and the E/G controller are closely associated with each other on the basis of the state of overall shift control, thereby performing shifting with improved smoothness.

BRIEF DESCRIPTION OF THE DRAWINGS

FIG. 4 is a diagram of the operation of the malfunction detecting system when there is no abnormality; and FIGS. 5 and 6 are diagrams each illustrating the operation of the malfunction detecting system when there is an abnormality.

DESCRIPTION OF THE PREFERRED EMBODIMENT

An embodiment of the present invention will be described below with reference to the accompanying drawings.

Figure 1:
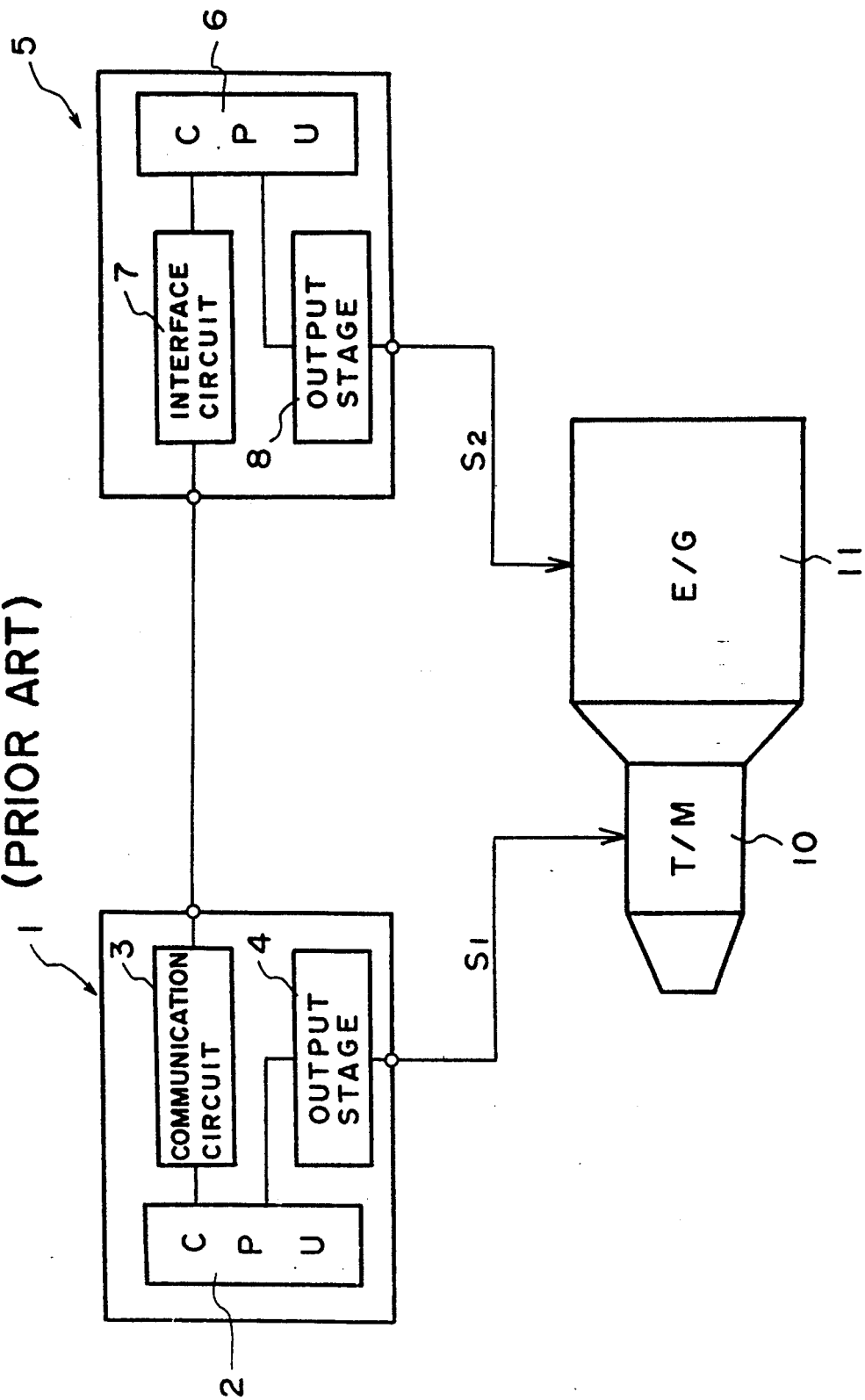
FIG. 1 is a diagram of the overall construction of a conventional control system.
Figure 2:
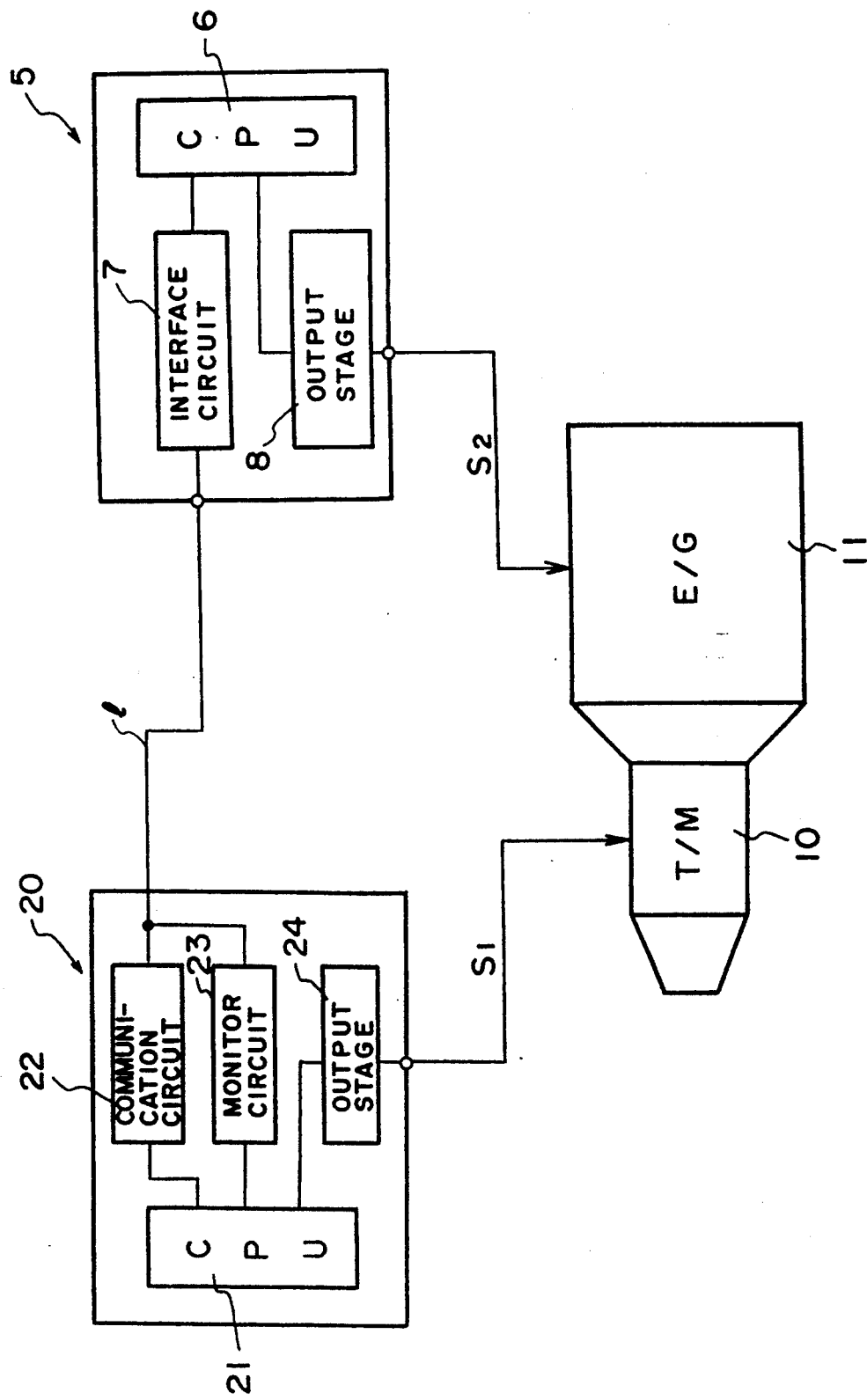
FIG. 2 is a diagram of the overall construction of a malfunction detecting system in accordance with the present invention which enables an electronic vehicle T/M controller to detect, at one end of a communication line, malfunctions of an interface circuit provided on the other end of the communication line.
Figure 3:
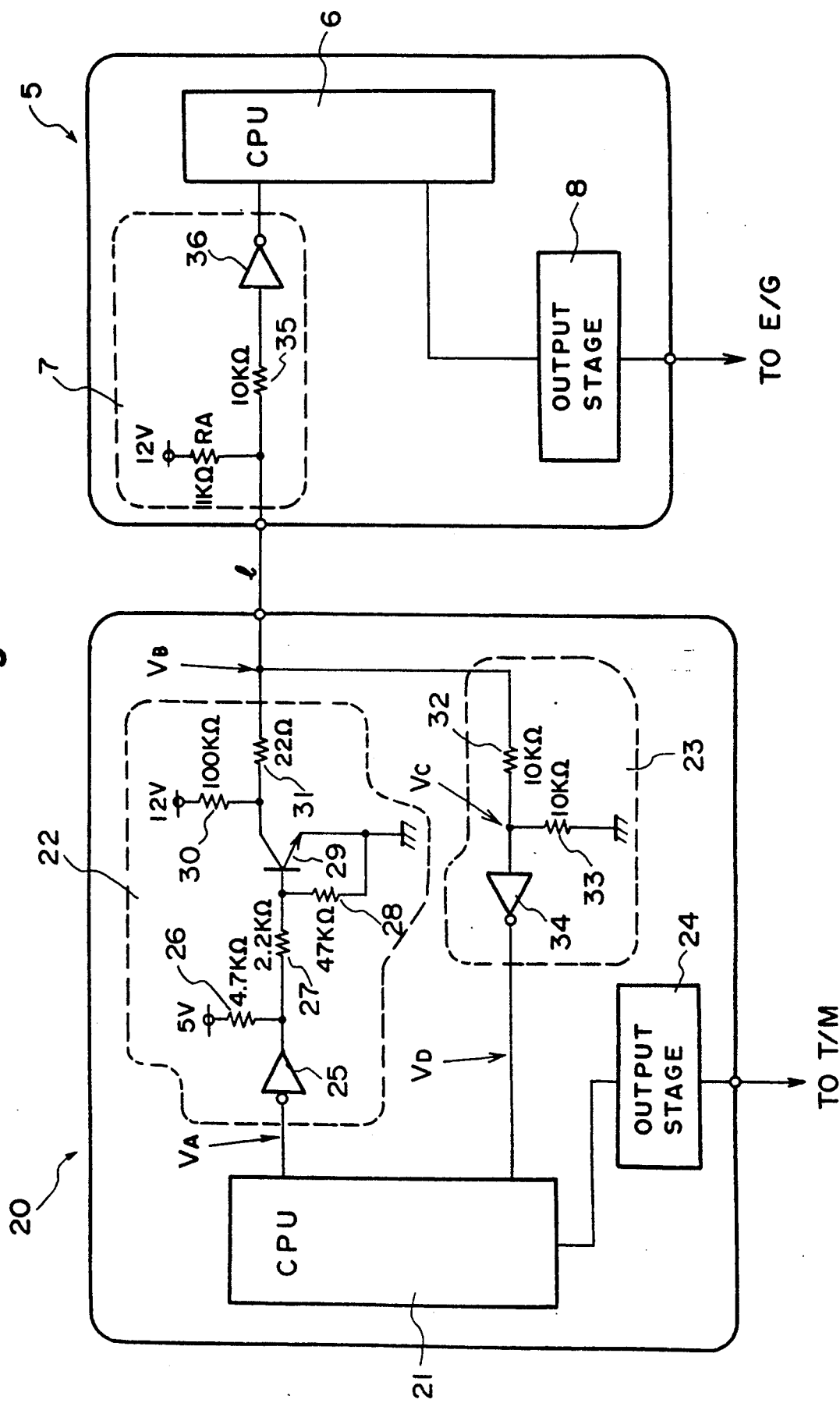
FIG. 3 is a circuit diagram of the malfunction detecting system.

FIG. 2 shows the overall construction of a malfunction detecting system which enables an electronic controller for controlling a vehicle transmission to detect, at one end of a communication line, malfunctions of an interface circuit provided on the other end of the communication line, and FIG. 3 shows a circuit arrangement of the malfunction detecting system of FIG. 2.

In accordance with the present invention, as illustrated in these drawings, a monitor circuit 23 for monitoring malfunctions of an interface circuit 7 of an E/G controller 5 located on the other end of a communication line is provided in the T/M controller 20. FIG. 3 shows an example of the circuit arrangement including a communication circuit 22 and the monitor circuit 23 of the T/M controller 20 and the E/G controller 5. That is, the communication circuit 22 is constituted by a negative logic NOT circuit 25 connected to a CPU 21, a resistor 26 connected between a power supply of 5 V and the output terminal of the negative logic NOT circuit 25, a resistor 27 connected between the output terminal of the negative logic NOT circuit 25 and the base of an npn transistor 29, a resistor 28 connected between the base and the emitter of the npn transistor 29 and the ground, the npn transistor 29, a resistor 30 connected between a power supply of 12 V and the collector of the npn transistor 29, and a resistor 31 connected between the collector of the npn transistor 29 and the output terminal of the communication circuit 22.

The monitor circuit 23 is constituted by a resistor 32 connected between the output terminal of the communication circuit 22 and the input terminal of a positive logic NOT circuit 34, a resistor 33 connected between the input terminal of the positive logic NOT circuit 34 and the ground, and the positive logic NOT circuit 34 connected to the CPU 21.

The interface circuit 7 of the E/G controller 5 is constituted by an input circuit (pull-up) resistor RA connected between the input terminal of the interface circuit 7 and a power supply of 12 V, and a resistor 35 connected between the input terminal and a positive logic NOT circuit 36, and the positive logic NOT circuit 36 connected between the resistor 35 and a CPU 6.

The T/M controller 20 and the E/G controller 5 are connected to each other by a communication line 1.

The resistance values of the above resistors may be determined as follows. The resistance 26 is 4.7 kΩ; the resistance 27, 2.2 kΩ; the resistance 28, 47 kΩ; the resistance 30, 100 kΩ; the resistance 31, 22 Ω; and the resistances 32, 33, and 35, 10 kΩ.

The operation of the above-described control system will be described below.

When the E/G controller 5 is in a normal state, voltages produced at different points are as shown in FIG. 4 in which $$L_A = L_B = L_C = L_D = 0 \text{ V}$$

$$H_A = H_D = 5 \text{ V}$$

$$H_B = 11.4 \text{ V}$$

∴ 12×(resistance 32+resistance 33)/[{combined resistance of parallel connection of (resistance 30+resistance 31) and resistance RA}+(resistance 32+resistance 33)]

$$H_C = \{10\ k/(10\ k + 10\ k)\} \times H_B = 5.7 \text{ V}$$

Then, $V_D = H_D = 5$ V output, when inverter voltage $V_C \leq 1.5$ V $V_D = L_D = 0$ V output, when inverter voltage $V_C \geq 3.5$ V That is, if the output signal from the CPU 21 is low level, the npn transistor 29 is turned on and $V_B$ and $V_C$ become low level. $V_C$ at the low level is converted by the NOT circuit 34 into a high level signal which is input into the CPU 21. If the output signal from the CPU 21 is high level, the npn transistor 29 is turned off and $V_B$ and $V_C$ become high level so long as the resistor RA has a normal value. $V_C$ at the high level is converted by the NOT circuit 34 into a low level signal which is input into the CPU 21.

Next, if the input circuit resistor RA of the E/G controller 5 or the communication line 1 is disconnected, the voltages at the above points are as shown in FIG. 5 in which $$L_B' = \{(10k + 10k)/(100k + 22 + 10k + 10k)\} \times 12$$
$$= 2.0 \text{V}$$
$$L_C' = \{10k/(10k + 10k)\} \times L_B' = 1.0 \text{V}$$

That is, if the output signal from the CPU 21 is low level, the npn transistor 29 is turned on and $V_B$ and $V_C$ become low level. $V_C$ at the low level is converted by the NOT circuit 34 into a high level signal which is input into the CPU 21. If the output signal from the CPU 21 is high level, the npn transistor 29 is turned off while $V_B$ is set to 2.0 V divided by a series circuit constituted by the resistors 30 to 33 since the resistor RA is substantially ∞. This level, though low level, is further divided by the resistors 32 and 33 to set the $V_C$ to a low level of 1.0 V. Therefore, the NOT circuit 34 converts this low level into a high level signal which is input into the CPU 21.

In this case, $V_D$ becomes high level although it must be low level as a result of the high level output from the CPU 21 so long as the input circuit resistor RA is normal (refer to FIG. 4). The CPU 21 therefore determines that there is an abnormality, thereby detecting disconnection of the input circuit resistor RA.

Next, if the input circuit resistor RA of the E/G controller 5 is short-circuited, the voltages at above points are as shown in FIG. 6 in which $$H_B' = 12 \text{ V}$$

$$H_C' = 6 \text{ V}$$

That is, if the output signal from the CPU 21 is low level, the npn transistor 29 is turned on, and the voltage of the 12 V power supply for the interface circuit 7 is directly applied as $V_B$ since the input circuit resistor RA is short-circuited. $V_B$ of 12 V is divided by the resistors 32 and 33 so as to set $V_C$ to a high level of 6 V. This high level is converted by the positive logic NOT circuit 34 into a low level signal which is input into the CPU 21.

In this case, $V_D$ becomes low level although it must be high level as a result of the low level output from the CPU 21 so long as the input circuit resistor RA is normal (refer to FIG. 4). The CPU 21 therefore determines that there is an abnormality, thereby detecting the short circuit of the input circuit resistor RA.

If one of such malfunctions of the interface circuit 7 of the E/G controller 5 takes place, the CPU 21 of the T/M controller 20 does not supply line pressure reduction signal $S_1$ to the transmission 10 through the output stage 24.

Provided that the interface circuit 7 of the E/G controller 5 is normal, the E/G controller 5 outputs an E/G output torque reduction signal $S_2$ through the output stage 8 to reduce the output torque of the engine by controlling, for example, the fuel injection rate of injectors of the engine 11 or the ignition timing of the ignitor. At this time, the T/M controller 20 outputs a line pressure reduction signal $S_1$ to the transmission 10 through the output stage 24 to reduce the line pressure by controlling, for example, a primary regulator valve.

Thus, the operations of the T/M controller 20 and the E/G controller 5 are closely associated with each other on the basis of the state of overall shift control, thereby performing shifting with improved smoothness.

The present invention is not limited to the above-described embodiment; other various modifications based on the spirit of the present invention are possible and they are not excluded from the scope of the present invention.

What is claimed is:

1. A system for detecting a malfunction of an interface circuit in a communication line between two controllers in a vehicle control system, comprising:
   a first electronic controller for controlling a vehicle transmission,
   a second electronic controller for controlling a vehicle engine, and
   a communication line connected between the first electronic controller and the second electronic controller,
   said first electronic controller having
   a first central processing unit,
   a communication circuit connected between the first central processing unit and the communication line,
   a first output stage connected between the first central processing unit and the communication line,
   a monitoring circuit connected between the first central processing unit and the communication line,
   said second electronic controller having
   a second central processing unit,
   a second output stage connected between the second electronic controller and the vehicle engine, and
   an interface circuit connected between the second central processing unit and the communication line,
   said interface circuit including a pull-up resistor connected between the second central processing unit and the communication line, and wherein
   said first central processing unit outputs a signal to the communication circuit for producing a torque reduction signal in the second central processing unit,
   said first central processing unit determines an abnormal or normal condition on the basis of comparing the signal output from the monitoring circuit with the signal output to the communication circuit,
   said first central processing unit outputs a signal to the first output stage for reducing the line pressure applied to said vehicle transmission in the case of a normal condition, and
   said first central processing unit outputs a signal to the first output stage for maintaining the line pressure to said vehicle transmission in the case of an abnormal condition.

2. A system according to claim 1, wherein:
   said monitoring circuit is responsive to the disconnection of said pull-up resistor or said communication line to indicate a first abnormality of said interface circuit.

3. A system according to claim 2, wherein:
   said monitoring circuit is responsive to the short circuit of said pull-up resistor to indicate a second abnormality of said interface circuit.

4. A system according to claim 3, wherein:
   said first central processing unit detects the first or second abnormality of said interface circuit when the signal provided by said monitoring circuit to said first central processing unit deviates from its normal condition.

5. A system according to claim 1, wherein:
   the signal output to the communication circuit and the signal output from the monitoring circuit are binary signals.

* * * * *